F. C. STEVENS.
DUSTING APPARATUS.
APPLICATION FILED JUNE 14, 1909.
967,993.
Patented Aug. 23, 1910.
3 SHEETS—SHEET 1.
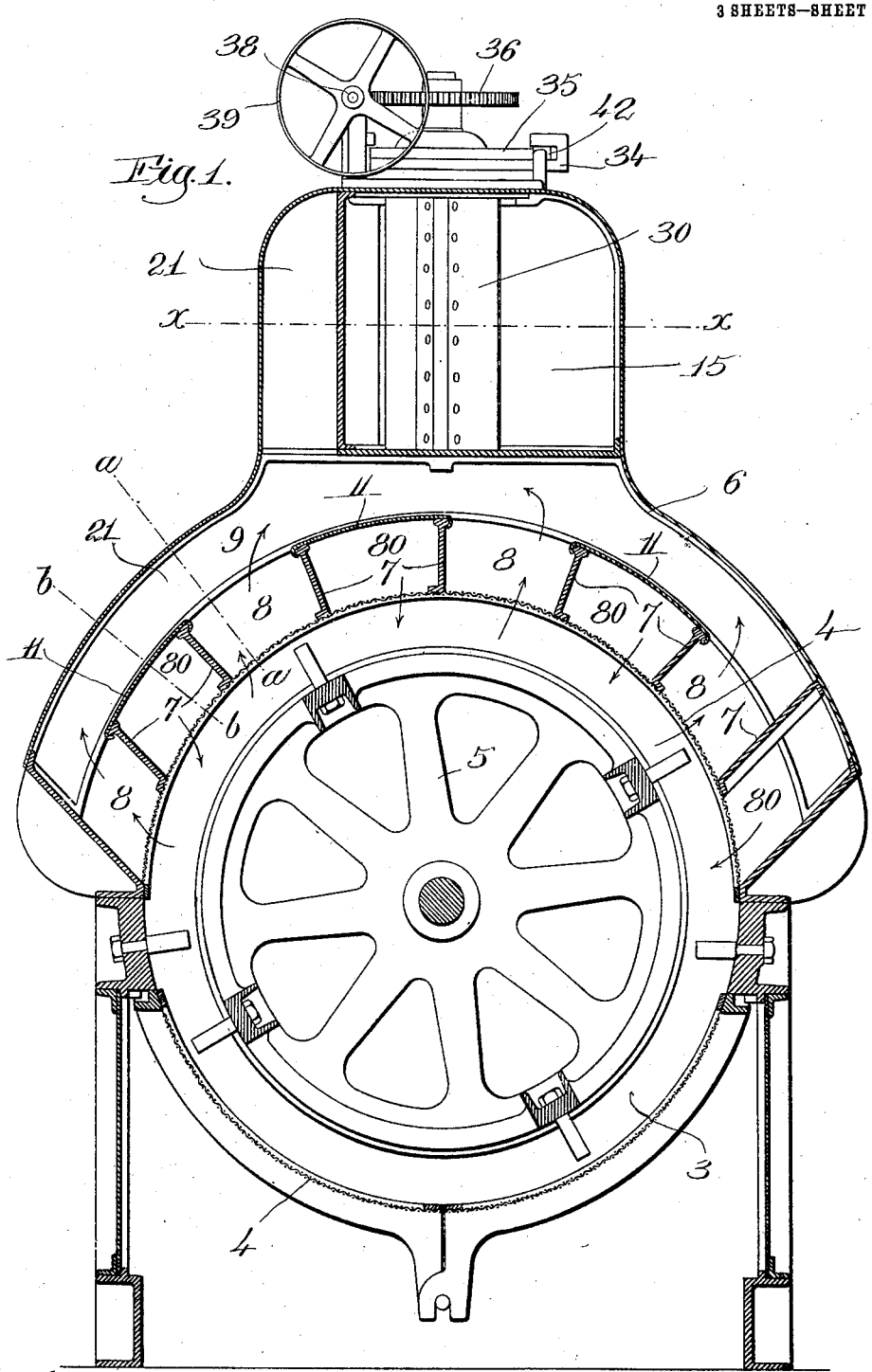

F. C. STEVENS.
DUSTING APPARATUS.
APPLICATION FILED JUNE 14, 1909.
967,993.
Patented Aug. 23, 1910.
3 SHEETS—SHEET 2.
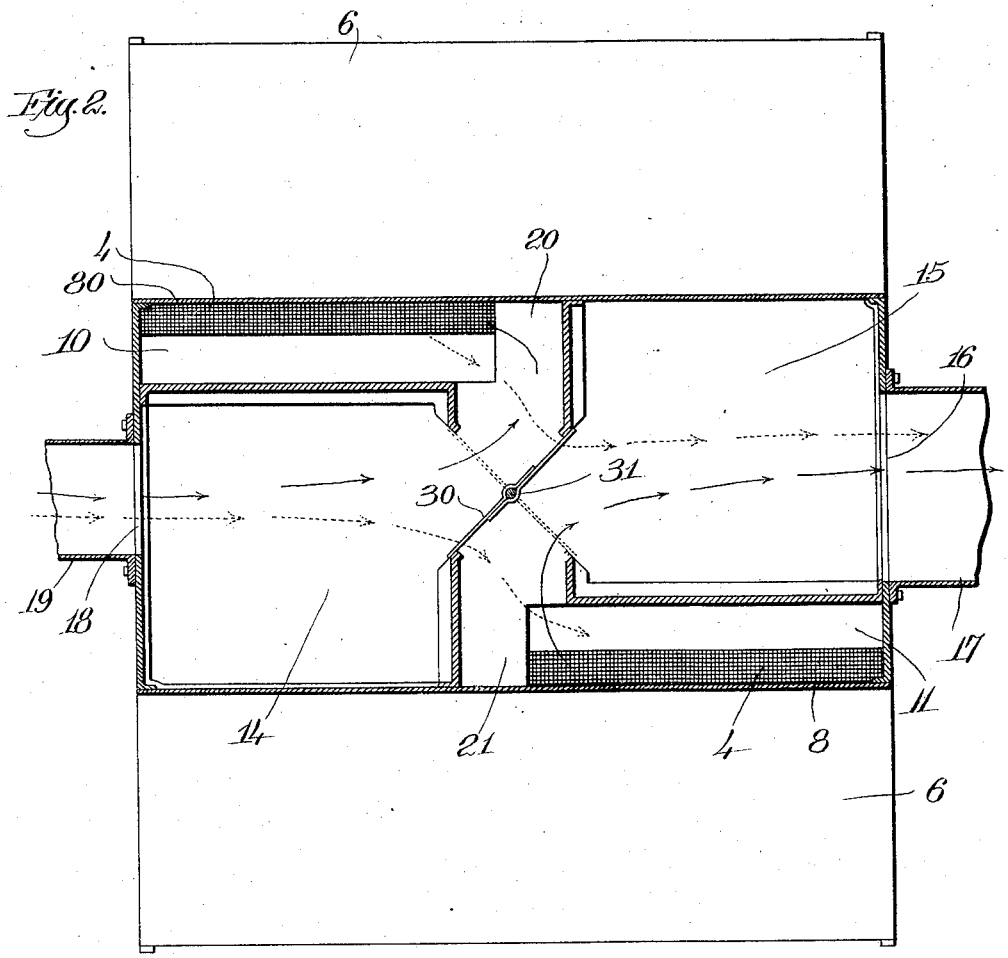
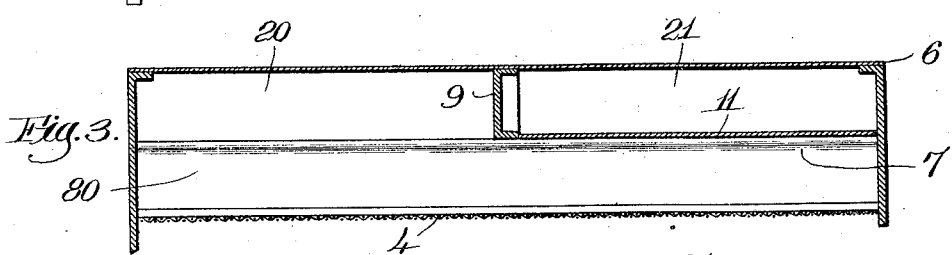
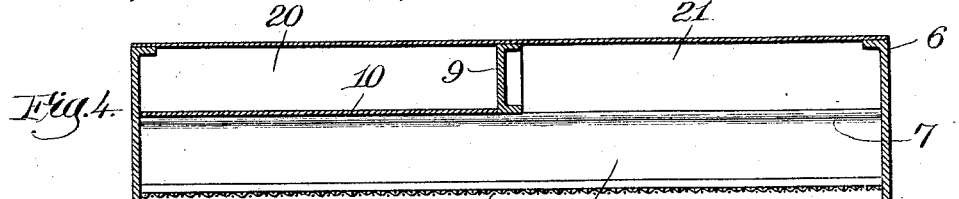

F. C. STEVENS.
DUSTING APPARATUS.
APPLICATION FILED JUNE 14, 1909.
967,993.
Patented Aug. 23, 1910.
3 SHEETS—SHEET 3.
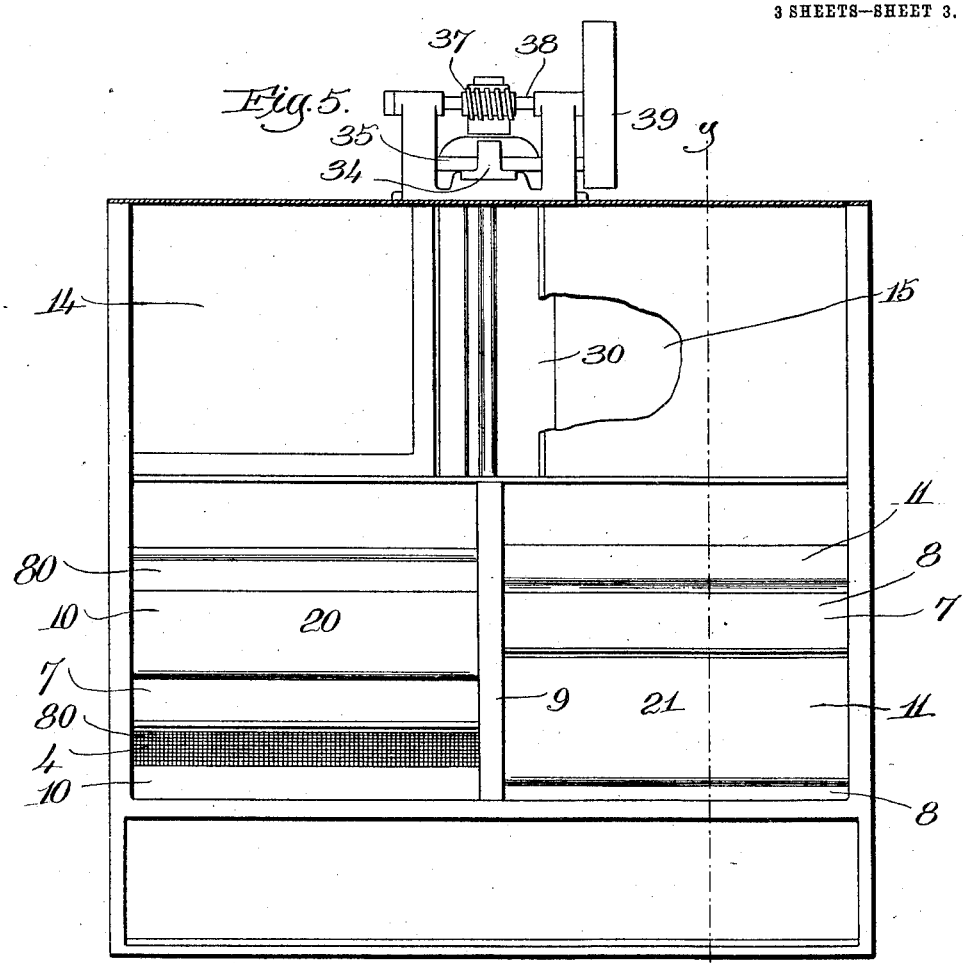
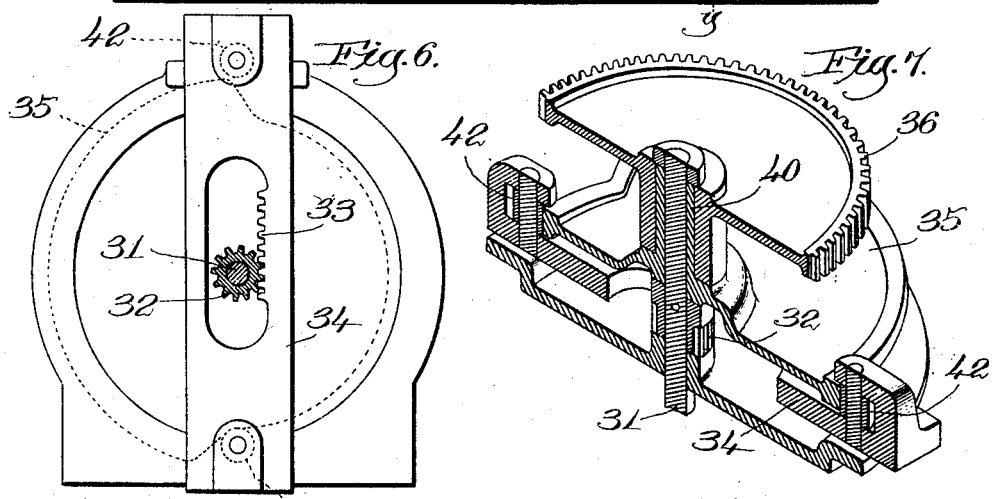

UNITED STATES PATENT OFFICE.

FRANK C. STEVENS, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

DUSTING APPARATUS.

967,993.  Specification of Letters Patent.  Patented Aug. 23, 1910.

Application filed June 14, 1909.  Serial No. 501,917.

*To all whom it may concern:*

Be it known that I, FRANK C. STEVENS, a citizen of the United States, residing at North Andover, county of Essex, and State of Massachusetts, have invented an Improvement in Dusting Apparatus, of which the following description, in connection with the accompanying drawing, is a specification, like characters on the drawing representing like parts.

This invention relates to a dusting apparatus which is adapted to remove dust from fibrous material by a blast of air, and particularly to that type wherein the fibrous material is introduced into and passed through a compartment or dusting chamber having perforated or reticulated walls. An air current is passed through this chamber that operates to remove the dust from the material, the material being beaten or agitated while in the compartment or chamber to assist in removing the dust. One difficulty which is met with in dusting apparatus of this type is that the inner surface of that portion of the reticulated wall through which the air is exhausted soon becomes clogged with fibers which are drawing against it by the air current, and when this happens the efficiency of the apparatus is greatly reduced.

My invention has for its object to provide a novel construction whereby the inner surface of the reticulated wall of the dusting chamber can be kept free and clear from lint whereby the apparatus may be worked under a maximum efficiency at all times.

Referring to the drawings wherein I have illustrated one embodiment of my invention, Figure 1 is a vertical section of a dusting apparatus built in accordance with my invention; Fig. 2 is a section on the line $x$—$x$, Fig. 1; Fig. 3 is a section on the line $a$—$a$, Fig. 1; Fig. 4 is a section on the line $b$—$b$, Fig. 1; Fig. 5 is a side view of the upper part of Fig. 1 looking to the left with the outer wall of the housing removed to show the interior construction; Figs. 6 and 7 are details of the valve-reversing mechanism.

The main features of the dusting apparatus herein shown are similar to those now commonly used and these features have not been shown in detail because their construction and operation is well known to those skilled in the art. It is sufficient to say that the dusting apparatus comprises a dusting chamber 3 having a wall 4 which is perforated or reticulated, and within which chamber a rotary beater or similar element 5 is situated and rotates. The material to be dusted is passed through the chamber 3 from one end to the other thereof and simultaneously air is forced into the chamber through one portion of the wall 4 and is withdrawn from the chamber through another portion of the wall, the current of air in passing through the chamber operating to take with it the dust which is loosened and shaken from the material. Since these parts are old and form no part of the present invention I have not deemed it necessary to illustrate them in any more detail than is shown in Fig. 1.

As stated above, my invention relates to a novel construction whereby the interior surface of the wall 4 of the chamber 3 may be kept free from lint or other fibrous material which would naturally be drawn thereagainst by the outgoing current of air. I accomplish the object by arranging a novel manner of reversing the direction of the air current through the chamber 3 so that for a certain period of time the air will be delivered to the chamber through certain portions of the wall 4 and withdrawn through other portions, and during the succeeding interval of time will be introduced through the latter portions and withdrawn through the former portions. During the first interval of time the lint and loose fibers will gradually gather on the interior surface of the portion of the wall through which the air is withdrawn, and during the second interval of time when the air is introduced through such portions of the wall, this accumulated lint will be blown off and the wall will thus be automatically kept clear from lint. This reversing preferably takes place at regular periods of time and by means of this construction the wall 4 of the chamber will be kept clear and there will be no need of stopping the beater for cleaning said wall.

In the present embodiment of my invention the air is introduced to the chamber 3 and is withdrawn therefrom through the upper half of the wall 4, but the invention would not be departed from if the air were introduced to and withdrawn through the lower half or any other portion of the wall.

In carrying out my invention as embodied in the construction illustrated in the drawings, I cover the upper half of the chamber 3 with a housing 6 which is separated some distance from the wall 4 and which forms a space between it and the wall 4. Arranged within this housing are a plurality of partitions 7 extending longitudinally of the drum or chamber 3 and also extending from the wall 4 outwardly in a radial direction. These partitions form separate compartments 8 and 80 each of which is in communication with the interior of the chamber 3 through the reticulated wall 4. The space within the housing 6 is also divided transversely to form two chambers 20 and 21. This is accomplished by means of a partition 9 which extends from the outer end of the partition 7 to the housing 6. The compartments 8 all communicate with the space 21 only, and the other compartments 80 have communication with the space 20 only. I secure this end by partitions 10 and 11, the partitions 10 extending from the top of one partition 7 to the top of the next adjacent one and separating the compartments 8 from the space 20, and the other partitions 11 being similarly placed and separating the compartments 80 from the space 21. From the above it will be seen that each of the compartments 8 and 80 extend from one end to the other of the chamber 3, but that these compartments are entirely separate from each other, and that the compartments 8 communicate only with the space 21, while the compartments 80 communicate only with the space 20.

The housing 6 is formed at its upper end with two chambers 14 and 15. The chamber 15 communicates through a port or opening 16 with a pipe 17 leading to an exhaust apparatus, while the chamber 14 communicates through a port 18 with a pipe 19 which may communicate with a blower, or which may simply be open to the atmosphere, as desired. The air always enters through the pipe 19 into the chamber 14, from which chamber it is delivered to the dusting chamber 3, and the air is exhausted from the dusting chamber into the chamber 15 from which it is delivered from the apparatus. Provision is made whereby the chamber 14 may be connected either to the space 20 or to the space 21. When the chamber 14 is connected to the space 20, then the air entering the duster will pass into said space 20 and into all of the compartments 80 and will pass into the dusting chamber 3 through the portions of the wall 4 forming the bottom of the compartments 80. The air will be exhausted from the dusting chamber through the portions of the wall forming the bottom of the compartments 8 and from said compartments 8 will pass into the space 21 and thence to the exhaust chamber 15.

After the apparatus has been operating for such a length of time that the inner surfaces of the wall 4 constituting the bottom of the compartments 8 become somewhat coated with fibrous material, the direction of the current is reversed, that is, it is delivered from the chamber 14 to the space 21 and thence to the dusting chamber through the compartments 8 and is exhausted from the dusting chamber through the compartments 80 and the space 20 which is connected with the exhaust chamber 15. This reversal of current will blow off from the under side of the wall 4 any lint or other fibrous material which may have collected thereon, and thus the duster will be automatically cleaned. This reversing of the current of air is secured by means of the reversing valve 30 which is situated so that it may connect either of the chambers 14 and 15 with the spaces 20 and 21 as desired. As shown in Fig. 2, the valve is placed so that the chamber 14 communicates with the space 20 and the chamber 15 communicates with the space 21, but by throwing the valve into the dotted line position the chamber 14 may be made to communicate with the space 21, and the chamber 15 to communicate with the space 20.

While it is within my invention to provide any suitable means for reversing the valve, I have herein shown a power-driven device for accomplishing this automatically at stated intervals of time. The valve is shown as mounted on a shaft or spindle 31 which extends up through the top of the housing 6 and has secured thereto a pinion 32 which meshes with and is driven by a rack 33. The rack is formed on a slide 34 which is moved back and forth in suitable guides and which is given its movement by a cam 35 that is rigid with and is driven by a worm gear 36. The worm gear in turn is operated by a worm 37 mounted on a driving shaft 38 which is driven by means of a suitable driving pulley 39. The cam 35 is herein shown as provided with the hub 40 which is loosely mounted on the upper end of the shaft 31, and this hub has fast thereto the gear 36. The cam 35 engages two rollers 42 that are carried by the slide 34, and said cam is shaped so that it will give the slide its movement in both directions, as is clearly shown in Fig. 6 wherein the cam is shown in dotted lines. This particular mechanism for reversing automatically the valve 30 is not essential to my invention, however.

From the above it will be seen that at regular intervals of time the valve 30 will be turned from the full to the dotted line position and vice versa, and also that the shifting of the position of the valve will reverse the direction of current through the apparatus and by this means the inner surface of the wall 4 will be automatically kept clean from accumulations of lint or other fibrous material which would tend to impede the passage of air and thus reduce the efficiency of the apparatus.

I have herein shown one embodiment only of my invention and therefore do not wish to be limited to the constructional details illustrated.

Having fully described my invention, what I claim as new and desire to secure by Letters Patent is:—

1. In a dusting apparatus, the combination with a dusting chamber adapted to receive the material to be dusted and having a portion at least of its wall reticulated, and a beater within said chamber, of means to deliver air into the interior of said dusting chamber through certain portions of its reticulated wall and at the same time to withdraw the air from said chamber through other portions of its reticulated wall, and means to reverse the direction of the air current through said chamber.

2. In a dusting apparatus, the combination with a dusting chamber adapted to receive the material to be dusted and having a portion at least of its wall reticulated, and a beater within said chamber, of means to deliver air into the interior of said dusting chamber through certain portions of its reticulated wall and at the same time to withdraw the air from said chamber through other portions of its reticulated wall, and means to reverse the direction of the air current through said chamber at stated intervals of time.

3. In a dusting apparatus, the combination with a dusting chamber adapted to receive the material to be dusted and having a reticulated wall and a beater within said chamber, of means dividing a part at least of said reticulated wall into sections, means to deliver air into the chamber through one section of said wall while exhausting the air through another section, and means to reverse the direction of the current of air.

4. In a dusting apparatus, the combination with a dusting chamber having a reticulated wall, of a housing inclosing a portion at least of said reticulated wall, means dividing said housing into separate compartments each of which communicates with the interior of the dusting chamber through said reticulated wall, means to force air into the dusting chamber through certain of said compartments and to exhaust it from the dusting chamber through other compartments, and means to reverse the direction of the air current.

5. In a dusting apparatus, the combination with a dusting chamber having a reticulated wall, of a plurality of partitions extending longitudinally of said chamber exterior thereto and forming exterior to said wall a plurality of separate compartments, a housing inclosing said compartments and divided to present two spaces, one of which communicates with certain of said compartments and the other of which communicates with the remainder of said compartments, means to force air into either one of said spaces and to exhaust the air from the other of said spaces and means to reverse the direction of the air current.

6. In a dusting apparatus, the combination with a dusting chamber having a reticulated wall, of a plurality of partitions extending longitudinally of said chamber exterior thereto and forming exterior to said wall a plurality of separate compartments, a housing inclosing said compartments and divided to present two spaces, one of which communicates with certain of said compartments and the other of which communicates with the remainder of said compartments, said housing also having an air inlet chamber and an exhaust chamber, and a valve adapted to connect the air inlet chamber with either of said spaces, and the exhaust chamber with the other of said spaces.

7. In a dusting apparatus, the combination with a dusting chamber having a reticulated wall, of a plurality of partitions extending longitudinally of said chamber exterior thereto and forming exterior to said wall a plurality of separate compartments, a housing inclosing said compartments and divided to present two spaces, one of which communicates with certain of said compartments and the other of which communicates with the remainder of said compartments, said housing also having an air inlet chamber and an exhaust chamber, a valve adapted to connect the air inlet chamber with either of said spaces and the exhaust chamber with the other of said spaces, and means to reverse the position of said valve at stated intervals of time.

In testimony whereof, I have signed my name to this specification, in the presence of two subscribing witnesses.

FRANK C. STEVENS.

Witnesses:
   WILLIAM D. RUNDLETT,
   ALFRED C. JENSEN.